United States Patent

[11] 3,628,044

[72] Inventors Donald S. Young
  Windham;
  John S. Hancock, Nashua, both of N.H.
[21] Appl. No. 815,603
[22] Filed Apr. 14, 1969
[45] Patented Dec. 14, 1971
[73] Assignee Sanders Associates, Inc.
  Nashua, N.H.

[54] SECOND HARMONIC LASER
  6 Claims, 2 Drawing Figs.
[52] U.S. Cl. .................................................. 307/88.3,
  321/69, 331/94.5
[51] Int. Cl. ................................................. H02m 5/00,
  H01s 3/10
[50] Field of Search .......................................... 307/88.3;
  321/69

[56] References Cited
UNITED STATES PATENTS
3,487,230 12/1969 Costich ........................ 307/88.3

Primary Examiner—Roy Lake
Assistant Examiner—Darwin R. Hostetter
Attorney—Louis Etlinger ABSTRACT: An improved second harmonic laser comprises a resonant cavity having disposed in axial alignment therein an active laser material, a second harmonic generating crystal, an electro-optic polarizing crystal and a polarization selector. The output end of the laser cavity comprises a pair of mirrors which have different preselected reflecting properties with respect to the fundamental and second harmonic laser wavelengths.

INVENTORS
DONALD S. YOUNG
JOHN S. HANCOCK

BY

AGENT

SECOND HARMONIC LASER

BACKGROUND OF THE INVENTION

1. Field of the Invention

The present invention relates generally to the field of electro-optics and more particularly to an improved second harmonic laser.

2. Description of the Prior Art

Since the introduction of the laser considerable effort has been expended in the expansion of the available wavelengths of laser energy. Prior to the present invention lasers having second harmonic generating crystals disposed within as well as without the laser cavity have been developed. Lasers of this type, however, are basically two color lasers in that energy at both the fundamental and second harmonic wavelength is contained in the output; i.e. the conversion efficiency is less than 100 percent. Further, narrow resonant second harmonic energy pulses having high peak power at high pulse repetition rates prior to the present invention have generally been unavailable.

OBJECTS AND SUMMARY OF THE INVENTION

It is therefore a primary object of the present invention to provide a new and novel second harmonic laser.

It is another object of the present invention to provide apparatus of the above described character wherein fundamental and second harmonic output wavelengths are segregated.

It is an additional object of the present invention to provide apparatus of the above described character capable of producing very narrow pulses of second harmonic energy.

It is a further object of the present invention to provide apparatus of the above described character producing high peak power pulses of second harmonic energy at high pulse repetition rates.

The foregoing as well as other objectives of the present invention are achieved by providing a laser having disposed within its resonant cavity a second harmonic generating crystal, a biased electro-optic polarizing crystal and a polarization selector. The laser output energy is polarized in accordance with the biasing voltage which is selectively applied to the polarizing crystal. The polarization selector operates to direct the laser energy to one of a plurality of output mirrors having different reflecting properties with respect to the fundamental and second harmonic laser wavelengths.

These and other objects, features and advantages of the present invention will become more apparent from the detailed description taken in conjunction with the appended drawings.

DESCRIPTION OF PREFERRED EMBODIMENT

Figure 1:
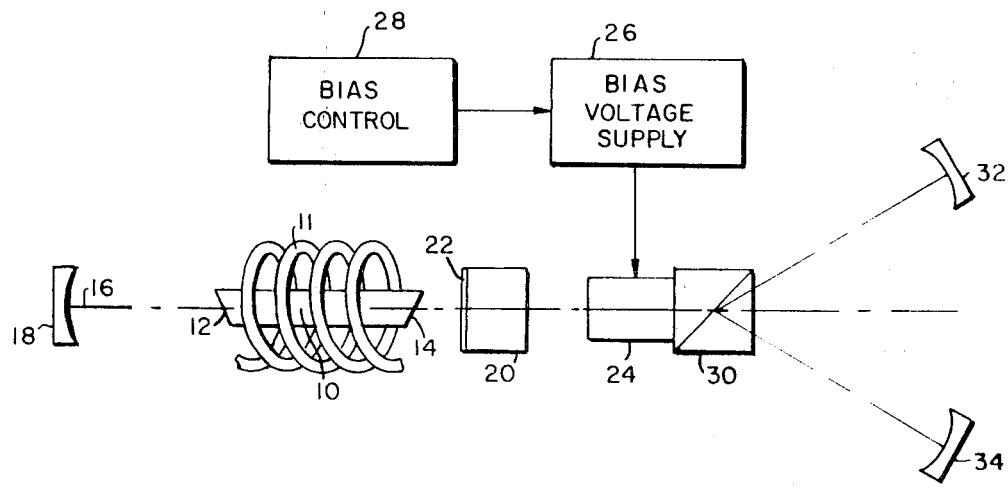
FIG. 1 is a schematic illustration of one embodiment of the present invention.

Turning now to FIG. 1 there is schematically illustrated an improved second harmonic laser constructed in accordance with the principles of the present invention. A rod 10 of active laser material surrounded by a flash lamp 11 and having the ends thereof cut such as to form Brewster windows 12 and 14 is disposed on the optical axis 16 of the resonant cavity, one end of which is formed by a mirror 18 which is substantially 100 percent reflective at both the fundamental and second harmonic laser wavelengths. A second harmonic generating medium 20 is disposed adjacent the laser rod 10 and is provided on its rear surface with a coating 22 which is substantially 100 percent reflective at the second harmonic laser wavelength and 100 percent transmissive at the fundamental laser wavelength. An electro-optic polarizing crystal 24 is disposed adjacent the harmonic generating medium 20 and is coupled to a bias voltage supply 26 which is in turn coupled to a bias control means 28. The electro-optic polarizing crystal is effective to rotate the polarization of the light from the laser rod 10 through 90° when a voltage equal of the half-wave voltage at the wavelength of interest; i.e. the fundamental or second harmonic, is applied thereto. The laser energy is coupled out of the resonant cavity by a polarization selector 30 such as a Wollaston prism by means of which the laser energy is directed to either one of mirrors 32 and 34 depending upon the polarization of the energy. Mirror 32 is substantially 100 percent reflective at the second harmonic laser wavelength and 100 percent transmissive at the fundamental. The mirror 34 on the other hand is substantially 100 percent reflective at the fundamental wavelength and 100 percent transmissive at the second harmonic wavelength.

Figure 2:
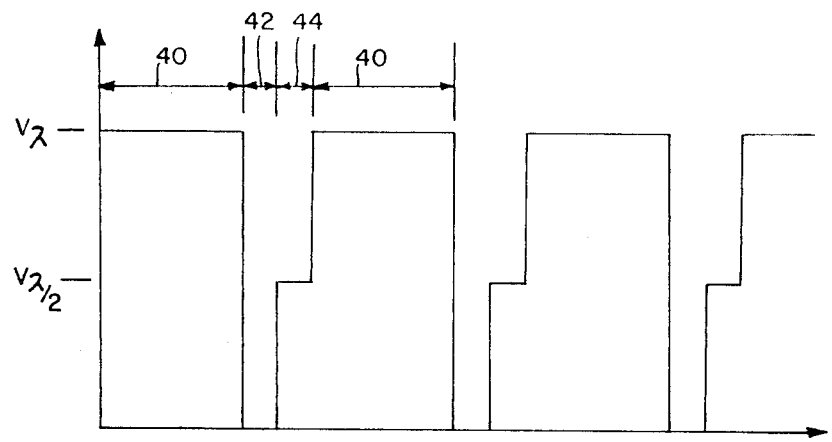
FIG. 2 graphically illustrates an appropriate waveform for the voltage applied to the electro-optic polarizing crystal of FIG. 1.

The operation of the apparatus of FIG. 1 may best be described with reference to FIG. 2 which is a graph of a typical output waveform from the bias voltage supply 26. During the initial phase 40 a half-wave voltage $V\lambda$ at the fundamental wavelength is applied to the polarizing crystal so that the polarization of the radiation from the laser rod 10 is rotated 90° from its original polarization due to the action of the Brewster windows 12 and 14 and directed by polarization selector 30 to mirror 32. The resonant cavity is thus operated at substantially 100 percent output coupling and the radiation at the fundamental wavelength exits the cavity via mirror 32. Oscillation is thus inhibited and a population inversion is allowed to build up in the laser rod 10 due to the input energy from the pump 11.

High regeneration occurs during the next phase 42 of operation when the polarizer voltage falls to zero. Since the polarization of the fundamental radiation returns to its original plane established by the Brewster windows 12 and 14, it is directed by polarization selector 30 to mirror 34. The second harmonic energy is polarized orthogonally to the fundamental energy when it is generated in the medium 20 and is thus directed by the polarization selector 30 to mirror 32. Thus oscillation of the fundamental energy between mirrors 18 and 34 during the period of substantially zero output coupling results in rapid regeneration. The coating 22 on the rear surface of the harmonic generating medium 20 operates to prevent reflection losses of the orthogonally polarized second harmonic radiation from the Brewster window 14 on the laser rod 10.

During the final phase 44 of the operating cycle the second harmonic energy is dumped from the resonant cavity by applying a half-wave voltage, $V_{\lambda/2}$ at the second harmonic wavelength to the polarizing crystal 24. This voltage causes the plane of polarization of the second harmonic radiation to be rotated into the original plane of the fundamental, established by the Brewster windows 12 and 14. The second harmonic radiation thus is directed by the polarization selector to mirror 34 which as stated above is substantially 100 percent transmissive at the second harmonic and 100 percent reflective at the fundamental. Thus the fundamental energy continues to oscillate within the resonant cavity, repetitively passing through the harmonic generating medium 20. Only the second harmonic energy is transmitted by mirror 34 resulting a monochromatic output at a frequency twice the fundamental. The operating cycle is then returned to its starting point by raising the polarizing crystal bias voltage to the half-wave voltage $V_\lambda$ at the fundamental wavelength.

By way of illustration the Applicants have found that an yttrium-aluminum-garnet (YAG) laser rod, which produces a fundamental wavelength of 1.06 microns may be operated in the above described manner in combination with a barium sodium niobate ($Ba_2NaNb_5O_{15}$) harmonic generating crystal, a deuterated potassium dihydrogen phosphate (KD*P) polarizing crystal and a Wollaston prism. A voltage of the form illustrated in FIG. 2 may be applied to the polarizing crystal at the repetition rate of about 5 kHz. The initial phase 40 is the longest and is established by the time required for the maximum population inversion to be reached as determined by the spontaneous emission lifetime of the laser material, which for YAG is on the order of about 200 microseconds. Phase 42 is on the order of a few nanoseconds and corresponds to the time for the second harmonic radiation to reach its peak energy density. The phase 44 is of a duration corresponding to the round trip transit time of the cavity, which in this illustration is about 5 nanoseconds.

The time periods during which a laser of the above described construction may be continuously operated are limited by the average power capability of the available flash tube pumps. In the YAG laser illustration described hereinabove a xenon flash tube was fired at 50 to 100 pulses per second with an "on-time" of about 1.2 milliseconds. The laser output comprised six pulse bursts of 0.53 micron energy at about 5 kHz. with about 10 to 20 milliseconds between bursts.

It will thus be apparent from the foregoing description that the Applicants have provided a new and novel second harmonic laser capable of producing very narrow resonant pulses having high peak power at high pulse repetition rates. Since certain changes may be made in the above construction without departing from the scope of the invention it is intended that all matter contained in the foregoing description or shown in the appended drawings be construed as illustrative and not in a limiting sense.

Having described what is new and novel and desired to secure by Letters Patent, what is claimed is:

1. An improved second harmonic laser structure comprising in combination
   an active laser element,
   a light source for optically pumping said laser element to produce output energy having a predetermined fundamental frequency and polarization,
   a second harmonic generating medium disposed adjacent said laser element and responsive to said fundamental frequency energy to convert at least a portion thereof to energy at the second harmonic having polarization which is orthogonal to said fundamental energy,
   a reflective coating disposed on the surface of said harmonic generating medium adjacent said laser element said coating being substantially 100 percent reflective of second harmonic energy and 100 percent transmissive of said fundamental energy,
   means disposed adjacent said harmonic generating medium for selectively rotating the polarization of said fundamental and second harmonic energy,
   means disposed adjacent said polarization rotating means for selectively directing said fundamental and second harmonic energy in one of first and second preselected directions as a function of the polarization thereof, and
   means for defining an optical cavity including a first reflector disposed adjacent said active laser element opposite said harmonic generating medium and substantially 100 percent reflective of both said fundamental and said second harmonic energy, a second reflector disposed in said first preselected direction with respect to said directing means and substantially 100 percent reflective of said second harmonic and 100 percent transmissive of said fundamental energy, and a third reflector disposed in said second preselected directions with respect to said directing means and substantially 100 percent transmissive of said second harmonic and 100 percent reflective of said fundamental energy.

2. Apparatus as recited in claim 1 wherein
   said directing means is effective to direct energy having the polarization of said fundamental energy emitted by said laser element in said first direction and energy having orthogonal polarization in said second direction.

3. Apparatus as recited in claim 1 wherein said polarization rotating means comprises
   an electro-optic polarizing crystal and a variable voltage source coupled to said crystal whereby the polarization of energy passing therethrough is rotated in accordance with the voltage level coupled from said source to said crystal.

4. Apparatus as recited in claim 3 wherein
   said polarizing crystal is a deuterated potassium dihydrogen phosphate crystal.

5. Apparatus as recited in claim 3 further including
   means for sequentially controlling the voltage from said source to levels corresponding to the half-wave voltage at said fundamental frequency whereby the polarization of said fundamental energy is rotated through 90° substantially zero voltage, and the half-wave voltage at said second harmonic frequency whereby the polarization of said second harmonic energy is rotated through 90°.

6. Apparatus as recited in claim 1 wherein
   said active laser element is an yttrium aluminum garnet element, and
   said harmonic generating medium comprises a barium sodium niobate crystal.

* * * * *